(No Model.)

C. R. CHUTE.
REIN GUARD.

No. 273,955. Patented Mar. 13, 1883.

Attest.
Sidney P. Hollingsworth
Newton Dyckoff

Inventor
C. R. Chute
By his Attorney
Philip T. Dodge

UNITED STATES PATENT OFFICE.

CHARLES R. CHUTE, OF MINNEAPOLIS, MINNESOTA.

REIN-GUARD.

SPECIFICATION forming part of Letters Patent No. 273,955, dated March 13, 1883.

Application filed October 24, 1882. (No model.)

*To all whom it may concern:*

Be it known that I, CHARLES R. CHUTE, of Minneapolis, in the county of Hennepin and State of Minnesota, have invented certain Improvements in Rein-Guards, of which the following is a specification.

The object of my invention is to provide a simple means of preventing the ordinary reins employed for driving horses from becoming engaged beneath the tail of the animal; and to this end it consists in a rigid rein-supporting guard adapted to be attached to the harness, and to extend outward or rearward beyond the roots of the animal's tail for the purpose of holding the reins therefrom, the device being constructed and applied in such a manner that it prevents the reins from falling downward in such position as to be caught beneath the tail.

My device may be constructed in various forms and adapted for permanent or temporary attachment to the harness, and for adjustment to animals of different sizes, all as hereinafter more fully explained.

I am aware that a strap has been "stretched over the outer part of the tail, so as to press tightly around the same, controlling the motion of the tail," and this I do not claim.

I am also aware that two upright arms provided with eyes at their ends have been extended upward and backward from the hip-strap; also, that the guiding-loop, to prevent the reins from falling sidewise when slackened, has been secured upon the hip-strap in the harness forward of the animal's tail, to maintain the reins in a substantially central position upon the animal's back.

My device differs from those described above, in that it extends rearward beyond the roots of the tail, crossing the same without coming in contact therewith, and serving simply as a guard to hold the reins backward away from the root of the tail, so as to prevent them from being caught thereunder.

Figure 1:
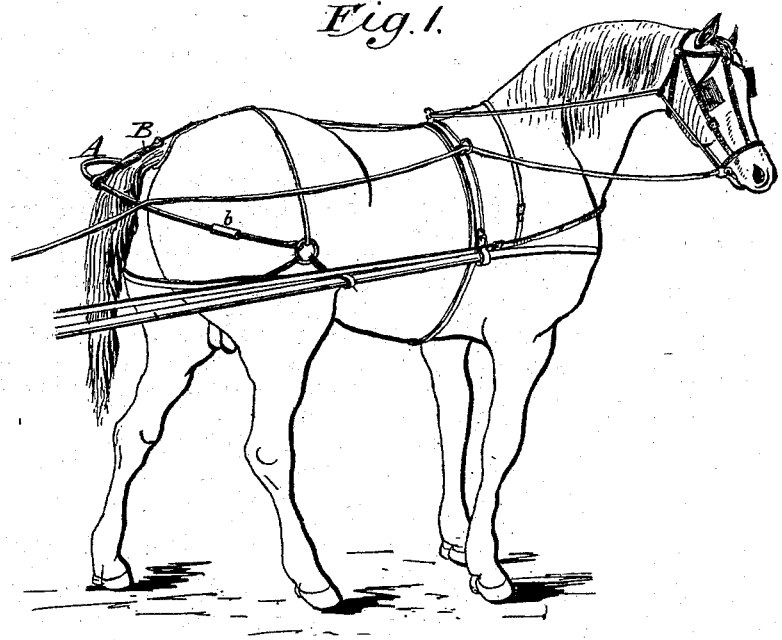
Figure 2:
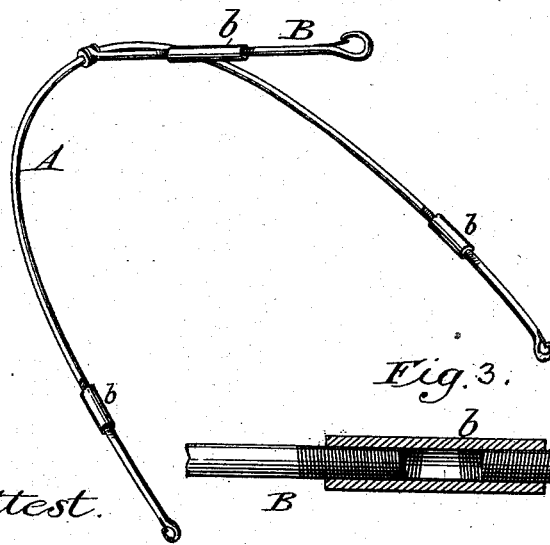
Figure 3:
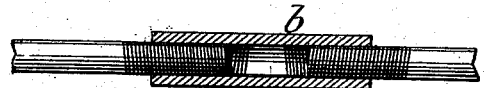

Referring to the accompanying drawings, Figure 1 represents a perspective view of my device in its preferred form in position for use. Fig. 2 is a perspective view of the device detached. Fig. 3 is a fragmentary section illustrating the manner in which the device is rendered adjustable.

Referring to the device as represented in Figs. 1 and 2, it will be seen to consist of but two principal parts—a semicircular rod or bow, A, and a suspension-arm, B, swiveled loosely upon the middle of the same. The bow A is made of such size and length as to extend from the breeching-rings backward and upward beyond the roots of the animal's tail, and the brace B is made of such length that when the bow is applied in the manner stated the forward end of the brace may be attached to the crupper-strap, the back-strap, or any other suitable portion of the harness, for the purpose of retaining the rear end of the bow in its proper elevated position.

The forward ends of the bow A and the brace B may be provided each with a snap-hook, as shown, or with a short buckle or strap, or any equivalent means by which they may be readily attached to the harness. It is to be distinctly understood, however, that the bow is in all cases to be made of such length and the fastening devices on its end of such character that when the bow is attached to the harness it will extend rearward beyond the tail a sufficient distance to permit a free motion of the latter.

While it is preferred to make the bow A of a semicircular form, as shown, it may be made of any other suitable form, provided only that it is adapted to extend outward or rearward beyond the tail, without bearing thereon, in substantially the position indicated in the drawings, the requirement being that the guard shall extend in such position as to hold the reins clear of the tail.

While it is preferred to adapt the bow for connection with the breeching-rings and the brace for attachment to the crupper-strap, it is to be distinctly understood that the parts may be modified for attachment to any other parts of the harness near the points indicated, the change of details required for this purpose being within the province of the skilled mechanic.

For the purpose of rendering the device adjustable for animals of different sizes and forms, the arms of the bow A and the suspension arm or brace B may be made, either or all of them, adjustable in length in any suitable manner, a very simple construction to this end being that represented in the drawings, wherein it will be seen that each arm is made of two lengths or sections, the ends of which are provided with screw-threads and connected by a straight sleeve, b, screwed thereon. This connection admits of the arm being increased or diminished in length, as required.

I am aware that supporting devices of various kinds have been constructed for attachment to the thills and dash-boards of vehicles to extend upward above the level of the animal's back for the purpose of sustaining the reins in an elevated position, and these I do not claim.

It will be observed that a guard constructed on my plan permits the reins to assume the ordinary position upon an animal's back, and simply serves to hold them backward or rearward beyond the roots of the tail without elevating them.

Having thus described my invention, what I claim is—

1. In combination with a harness, the rein-guard consisting of a rigid frame or rod attached at its ends and at its rear portion to the harness, and extending backward beyond the tail of the animal and out of contact therewith, as described and shown, whereby the reins are prevented from catching beneath the tail without impeding the motion of the latter.

2. As an improved article of manufacture, a guard to hold driving-reins away from a horse's tail, consisting of a bow or rod of rigid material throughout its entire length, provided with fastening and supporting devices, substantially as shown, said frame made of a size adapted to extend, when in position, beyond the roots of the animal's tail and out of contact therewith.

3. The arched frame A, of rigid material, having the hooks or clasps attached rigidly to its ends, in combination with the central sustaining-brace, B.

4. In combination with the rigid bow or arch A and the supporting-arm B, the clasps or hooks secured rigidly to the ends of the arch by means of adjusting devices.

CHARLES R. CHUTE.

Witnesses:
JOHN M. WILLIAMS,
H. N. LYON.